United States Patent
Kevenaar et al.

(10) Patent No.: US 7,925,055 B2
(45) Date of Patent: Apr. 12, 2011

(54) BIOMETRIC TEMPLATE SIMILARITY BASED ON FEATURE LOCATIONS

(75) Inventors: Thomas Andreas Maria Kevenaar, Eindhoven (NL); Antonius Hermanus Maria Akkermans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1158 days.

(21) Appl. No.: 11/570,045

(22) PCT Filed: Jun. 2, 2005

(86) PCT No.: PCT/IB2005/051793
§ 371 (c)(1),
(2), (4) Date: Dec. 5, 2006

(87) PCT Pub. No.: WO2005/122059
PCT Pub. Date: Dec. 22, 2005

(65) Prior Publication Data
US 2007/0266427 A1 Nov. 15, 2007

(30) Foreign Application Priority Data

Jun. 9, 2004 (EP) .................................. 04102609
Sep. 8, 2004 (EP) .................................. 04104322

(51) Int. Cl.
*G06K 9/00* (2006.01)
(52) U.S. Cl. ............. 382/115; 382/190; 382/280; 726/5
(58) Field of Classification Search ................... 382/115
See application file for complete search history.

(56) References Cited

U.S. PATENT DOCUMENTS

| 5,712,912 | A | 1/1998 | Tomko et al. |
| 2002/0028003 | A1* | 3/2002 | Krebs et al. .................... 382/115 |
| 2004/0000986 | A1* | 1/2004 | Ott ................................ 340/5.2 |
| 2004/0148509 | A1 | 7/2004 | Wu |

OTHER PUBLICATIONS

Duda et al; "Pattern Classification", 2001, John Wiley & Sons, Inc., pp. 164-171, XP002340083.
R. M. Bolle et al; "Biometric Perils and Patches", Pattern Recognition, Elsevier, Kidlington, GB, vol. 35, No. 12, Dec. 2002, pp. 2727-3203, XP004379643.
Pim Tuyls et al; "Capacity and Examples of Template-Protecting Biometric Authentication Systems", Philips Research, Eindhoven, NL.

(Continued)

*Primary Examiner* — Vu Le
*Assistant Examiner* — Michael Vanchy, Jr.
(74) *Attorney, Agent, or Firm* — Larry Liberchuk

(57) ABSTRACT

The present invention relates to a method and a system of determining correspondence between location sets. A basic idea of the present invention is to provide a scheme in which correspondence between location sets is determined. A feature location set (X) comprising a number (n+1) of components is transformed into a feature vector that can be used in an HDS. Therefore, a feature density function ($f_{js}(x)$) is created. A feature vector ($X_F$) for the HDS is chosen to be a sampled version of the feature density function ($f_{X,g}(x)$), which results in feature vectors of equal and finite dimensions regardless of the number (n+1) of features that are present in the biometric template $X_T$ from which the location sets is derived. Thereafter, a distance (d) between two feature location sets (X, Y) is determined. The distance (d) between the sets is chosen to be the Euclidian distance between the corresponding feature density functions.

25 Claims, 1 Drawing Sheet

OTHER PUBLICATIONS

Figure 1:
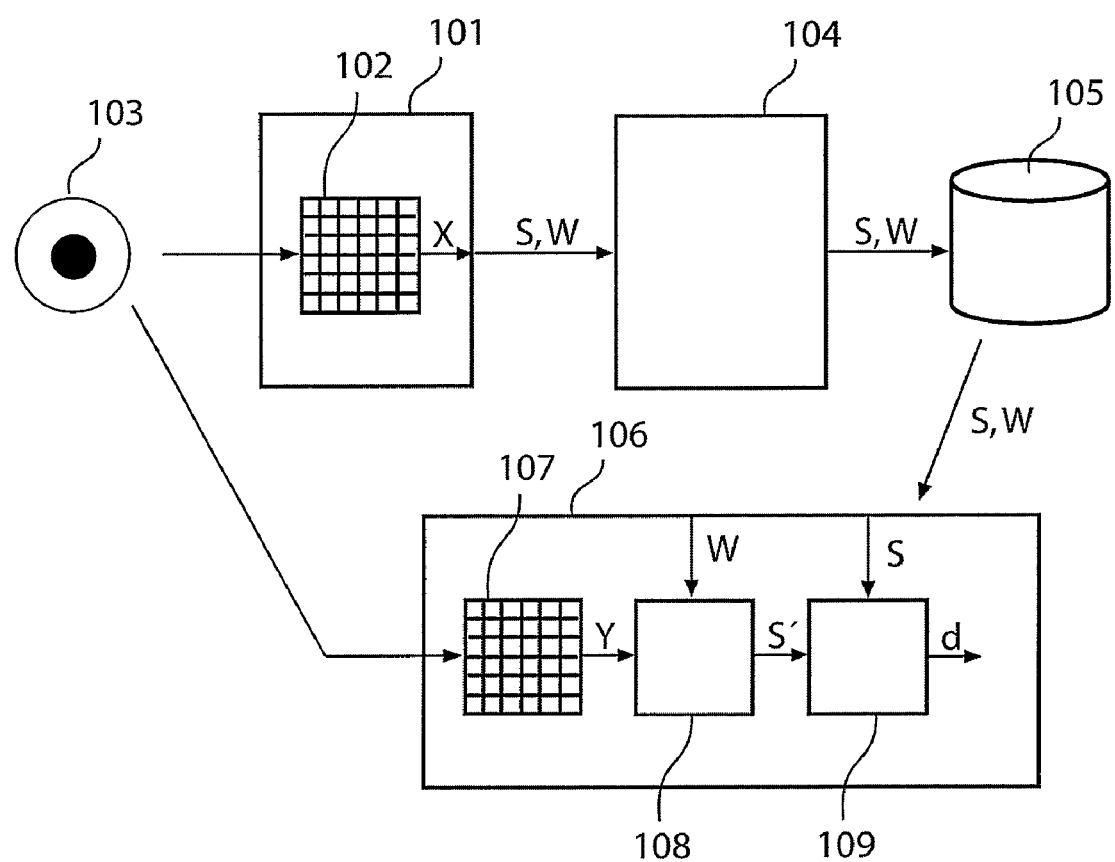

A. M. Bazen et al; "Likelihood-Ratio-Based Biometric Verification", IEEE Transactions on Circuits and Systems for Video Technology, vol. 14, Issue 1, Jan. 2004, pp. 86-94.

Soutar et al; "Biometric Encryption"; ICSA Guide to Cryptology, Chapter 22, 1999, Bioscrypt Inc. (Formerly MYTEC Technologies Inc.).

* cited by examiner

BIOMETRIC TEMPLATE SIMILARITY BASED ON FEATURE LOCATIONS

The present invention relates to a method and a system of determining correspondence between location sets.

Authentication of physical objects may be used in many applications, such as conditional access to secure buildings or conditional access to digital data (e.g. stored in a computer or removable storage media), or for identification purposes (e.g. for charging an identified individual for a particular activity).

The use of biometrics for identification and/or authentication is to an ever-increasing extent considered to be a better alternative to traditional identification means such as passwords and pin-codes. The number of systems that require identification in the form of passwords/pin-codes is steadily increasing and, consequently, so is the number of passwords/pin-codes, which a user of the systems must memorize. As a further consequence, due to the difficulty in memorizing the passwords/pin-codes, the user writes them down, which makes them vulnerable to theft. In the prior art, solutions to this problem have been proposed, which solutions involve the use of tokens. However, tokens can also be lost and/or stolen. A more preferable solution to the problem is the use of biometric identification, wherein features that are unique to a user such as fingerprints, irises, ears, faces, etc. are used to provide identification of the user. Clearly, the user does not lose or forget his/her biometric features, neither is there any need to write them down or memorize them.

The biometric features are compared to reference data. If a match occurs, the user is identified and can be granted access. The reference data for the user has been obtained earlier and is stored securely, e.g. in a secure database or smart card. In authentication, the user claims to have a certain identity and an offered biometric template is compared with a stored biometric template that is linked to the claimed identity, in order to verify correspondence between the offered and the stored template. In identification, the offered biometric template is compared with all stored available templates, in order to verify correspondence between the offered and stored template. In any case, the offered template is compared to one or more stored templates.

Whenever a breach of secrecy has occurred in a system, for example when a hacker has obtained knowledge of secrets in a security system, there is a need to replace the (unintentionally) revealed secret. Typically, in conventional cryptography systems, this is done by revoking a revealed secret cryptographic key and distributing a new key to the concerned users. In case a password or a pin-code is revealed, it is replaced by a new one. In biometric systems, the situation is more complicated, as the corresponding body parts obviously cannot be replaced. In this respect, most biometrics are static. Hence, it is important to develop methods to derive secrets from (generally noisy) biometric measurements, with a possibility to renew the derived secret, if necessary. It should be noted that biometric data is a good representation of the identity of an individual, and unauthenticated acquirement of biometric data associated with an individual can be seen as an electronic equivalent of stealing the individual's identity. After having acquired appropriate biometric data identifying an individual, the hacker may impersonate the individual whose identity the hacker acquired. Moreover, biometric data may contain sensitive and private information on health conditions. Hence, the integrity of individuals employing biometric authentication/identification systems must be safeguarded.

As biometrics provides sensitive information about an individual, there are privacy problems related to the management and usage of biometric data. For example, in prior art biometric systems, a user must inevitably trust the biometric systems completely with regard to the integrity of her biometric template. During enrolment—i.e. the initial process when an enrolment authority acquires the biometric template of a user—the user offers her template to an enrolment device of the enrolment authority which stores the template, possibly encrypted, in the system. During verification, the user again offers her template to the system, the stored template is retrieved (and decrypted if required) and matching of the stored and the offered template is effected. It is clear that the user has no control of what is happening to her template and no way of verifying that her template is treated with care and is not leaking from the system. Consequently, she has to trust every enrolment authority and every verifier with the privacy of her template. Although these kind of systems is already in use, for example in some airports, the required level of trust in the system by the user makes widespread use of such systems unlikely.

Cryptographic techniques to encrypt or hash the biometric templates and perform the verification (or matching) on the encrypted data such that the real template is never available in the clear can be envisaged. However, cryptographic functions are intentionally designed such that a small change in the input results in a large change in the output. Due to the very nature of biometrics and the measurement errors involved in obtaining the offered template as well as the stored template due to noise-contamination, the offered template will never be exactly the same as the stored template and therefore a matching algorithm should allow for small differences between the two templates. This makes verification based on encrypted templates problematic.

"Capacity and Examples of Template-Protecting Biometric Authentication Systems" by Pim Tuyls and Jasper Goseling, Philips Research, discloses a biometric authentication system in which there is no need to store original biometric templates. Consequently, the privacy of the identity of an individual using the system may be protected. The system is based on usage of helper data schemes (HDSs). In order to combine biometric authentication with cryptographic techniques, helper data is derived during the enrolment phase. The helper data guarantees that a unique string can be derived from the biometrics of an individual during the authentication as well as during the enrolment phase. Since the helper data is stored in a database, it is considered to be public. In order to prevent impersonation, reference data which is statistically independent of the helper data, and which reference data is to be used in the authentication stage, is derived from the biometric. In order to keep the reference data secret, the reference data is stored in hashed form. In this way impersonation becomes computationally infeasible.

In HDSs, biometric information in the form of a feature vector of a certain fixed dimension is required. If the feature vector obtained during enrolment resembles the feature vector obtained during authentication to a sufficient level, the helper data renders it possible to derive the same unique string for the two feature vectors. As a measure of resemblance, a distance between the two feature vectors may be used. Thus, an HDS allows taking into account small differences in the feature vectors that might be caused by measurement noise, distortion and omissions in the biometric templates.

In other schemes implemented in biometric authentication systems, the matching is performed based on location of well-distinguishable features in the templates. For example, systems using a fingerprint as a biometric template typically employ minutiae location in the templates when comparing them. Complicated algorithms operating directly on the actual minutiae locations are used to locate the minutiae and to determine whether there is a match or not. These feature location schemes (FLSs) also allow taking into account measurement noise, distortion and omissions in the location of the features to be matched, and also in general provide robust matching results. A combination of the helper data schemes and the feature location schemes is fruitful in that desirable properties associated with the respective schemes can be combined into one single scheme.

A problem that remains in the prior art is that combination of the helper data scheme with the feature location scheme is complicated. The helper data scheme requires feature vectors of fixed dimensions, and further that the distance between two feature vectors derived from templates that resemble each other to a sufficient degree should be small. Another problem to overcome in combining the two schemes is how to transform a set of feature locations into a feature vector having a fixed dimension.

An object of the present invention is to provide a scheme in which correspondence between location sets, which possibly are of different sizes, is determined.

This object is attained by a method in accordance with claim 1 and a system in accordance with claim 15.

According to a first aspect of the present invention, a method is provided comprising the steps of transforming a first location set comprising a number of components into a density function by summing averaging functions shifted to locations indicated by selected components in the first location set, and determining a distance between the density function and another density function that corresponds to a second location set comprising a number of components, wherein correspondence exists between the first and the second location set if said distance complies with a predetermined distance value.

According to a second aspect of the present invention, a system is provided comprising means for transforming a first location set comprising a number of components into a density function by summing averaging functions shifted to locations indicated by selected components in the first location set and means for determining a distance between the density function and another density function that corresponds to a second location set comprising a number of components, wherein correspondence exists between the first and the second location set if said distance complies with a predetermined distance value.

A basic idea of the present invention is to provide a scheme in which correspondence between location sets is determined. Note that in the following, it is assumed that the inventive scheme operates on feature location sets derived from biometric data of an individual. However, the scheme can be operable on any location set, and not necessarily a feature location set.

First, a feature location set $X=\{x_0, x_1, \ldots, x_n\}$ comprising $n+1$ components is transformed into a feature vector that can be used in an HDS. Therefore, a feature density function $f_{X,s}(x)$ is defined as $$f_{X,s}(x) = s(x) * \sum_{i=0}^{n} \delta(x - x_i), \qquad (1)$$

Where * denotes convolution and $s(x)$ is an averaging function. If it is assumed that, for example, $s(x)=\delta(x)$, then $$f_{X,\delta}(x) = \sum_{i=0}^{n} \delta(x - x_i). \qquad (2)$$

If $s(x)=e^{-ax^2} \triangleq g(x)$, then $$f_{X,g}(x) = \sum_{i=0}^{n} e^{-a(x-x_i)^2}. \qquad (3)$$

Hence, the location of every feature is represented by a Gaussian pulse. It is, in principle, possible to select any appropriate averaging function $s(x)$, and it can be seen that a different choice for $s(x)$ or a different value of the parameter "a" of Gaussian function $g(x)$ will result in different matching properties. In the following description, the Gaussian averaging function $g(x)$ is used. Note that throughout this description, in order to avoid unnecessarily complicated formulas, the scheme of the present invention will be described for locations given in a 1-dimensional space. As the skilled person realizes, the description can easily be extended to 2-dimensional or higher dimensional spaces. The feature vector for the HDS is now chosen to be $f_{X,g}(x)$. Typically, this will be a sampled version of the feature density function $f_{X,g}(x)$, which results in feature vectors of equal and finite dimensions regardless of the number $n+1$ of features (i.e. components) that are present in the template $X_T$.

Thereafter, a distance between two feature location sets is determined. Assume that a first feature location set $X=\{x_0, x_1, \ldots, x_n\}$ and a second feature location set $Y=\{x'_0, x'_1, \ldots, x'_m\}$ are derived from the individual. The second set is, in the case where the two sets are derived from the same individual, typically a noisy version of the first set, and the second set does not necessarily comprise the same number of components as the first set. For example, due to measurement noise, some features may become obscured in the measured biometric templates and are considered "invisible". Hence, it is possible that $n \neq m$.

Thus $$f_{X,g}(x) = \sum_{i=0}^{n} e^{-a(x-x_i)^2}; \qquad (4)$$

and $$f_{Y,g}(x) = \sum_{i=0}^{m} e^{-a(x-x'_i)^2}. \qquad (5)$$

The distance $d_{X,Y}$ between X and Y is chosen to be the Euclidian distance between the corresponding feature density functions and consequently $$d_{X,Y}^2 = \int_{-\infty}^{\infty} (f_{X,g}(x) - f_{Y,g}(x))^2 \, dx. \qquad (6)$$

In order to illustrate variations in this distance measure due to variations in the feature vectors, an example is given. For $X=\{0\}$ and $Y=\{x_0\}$, it is derived that $$d_{X,Y}^2(x_0) = \sqrt{\frac{2\pi}{a}} \{1 - e^{-\frac{a}{2}x_0^2}\}. \tag{7}$$

It is realized that for the choice of g(x) as an averaging function, the distance $d_{X,Y}$ between the feature location sets X, Y (and hence the corresponding feature vectors $f_{X,g}(x)$, $f_{Y,g}(x)$) gradually increases as the value of $x_0$ moves away from zero thus making X and Y more dissimilar. It is also realized that the parameter "a" can be used to adjust the distance for a given 'dissimilarity' and thus allows adjusting the sensitivity (i.e. the noise robustness) of the matching process with respect to measurement noise and distortion.

For an example in which X={0}, $Y_1${1} and $Y_2$={2}, it is clear that, using this distance measure and averaging function, $d_{X,Y_1} < d_{X,Y_2}$. If the average function would be chosen such that $s(x) = \delta(x)$, the change in distance between X and Y would become rather abrupt and the slightest measurement noise or distortion would immediately result in a large distance $d_{X,Y}$ between the feature vectors. In practice, this is not desired and a more gradual increase of the distance is required. Assuming that a predetermined threshold value of 1.5 is set as a maximum value of the distance $d_{X,Y}$ for which it is considered that Y complies with X, and that a=1 in (7), then $Y_1$ is considered to comply with X, while $Y_2$ is considered not to comply with X In the case the scheme is applied in a biometric authentication system, the individual associated with $Y_1$ is authenticated, while authentication for the individual associated with $Y_2$ fails.

The present invention is advantageous, since the proposed distance measure in combination with density functions derived from feature locations sets using an appropriate averaging function can be used in matching sets of feature locations derived from biometric templates. In particular, the present invention is advantageous since the two feature location sets to be compared to check for correspondence may contain a different number (i.e. n≠m) of components due to noise contamination, and that problem is overcome by the present invention. Another highly advantageous feature of the present invention is that the order of the two feature location sets is immaterial, i.e. it is irrelevant whether a component that has a certain index in the first location set (X) corresponds to a component having the same index in the second location set (Y). This is due to the fact that a density function is used, which function sums all components in the location sets. Hence, the particular order of the components has no significance.

According to an embodiment of the present invention, the determination of the distance between two feature vectors is performed in the frequency domain. The distance measure defined in the spatial domain hereinabove can alternatively be defined in the frequency domain. Again, assume that a first feature location set X={$x_0, x_1, \ldots, x_n$} and a second feature location set Y={$x'_0, x'_1, \ldots, x'_m$} are derived from the individual. In analogy with (2):

$$f_{X,\delta}(x) = \sum_{i=0}^{n} \delta(x - x_i) \xleftrightarrow{F} F_{X,\delta}(\omega); \tag{8}$$

and $$f_{Y,\delta}(x) = \sum_{i=0}^{m} \delta(x - x_i) \xleftrightarrow{F} F_{Y,\delta}(\omega). \tag{9}$$

A Gaussian filter is applied $$H(\omega) = \sqrt{\frac{\pi}{a}} e^{-\pi^2 \omega^2 / a} \tag{10}$$

to both $F_{X,\delta}(\omega)$ and $F_{Y,\delta}(\omega)$) to obtain $F_{X,\delta}^{(H)}(\omega)$ and $F_{Y,\delta}^{(H)}(\omega)$, respectively. The following function is defined $$d_{X,Y,\delta,H}^2 = \int_{-\infty}^{\infty} (F_{X,\delta}^{(H)}(\omega) - F_{Y,\delta}^{(H)}(\omega))^2 d\omega. \tag{11}$$

The same matching properties are achieved in the frequency domain as compared to the spatial domain and with a distance measure based on the 2-norm, both approaches are identical. Parseval's theorem concludes that $$\int_{-\infty}^{\infty} |f(x)|^2 dx = \int_{-\infty}^{\infty} |F(\omega)|^2 d\omega, \tag{12}$$

for the distance determination, the following holds $$d_{X,Y}^2 = d_{X,Y,\delta,H}^2. \tag{13}$$

Thus, matching can be effected in the frequency domain if a Fourier transform of the averaging function in the spatial domain is employed to perform the filtering in the frequency domain, which can be advantageous in some situations, for example when the sets of locations must be made translation and rotation invariant. Just as with matching in the spatial domain, the filter characteristic may be adjusted to adjust the sensitivity of the matching process.

In this description, a distance measure is defined for density functions, which enables noise-robust matching. A Gaussian function is used as averaging function to illustrate how the value of a gradual distance change between feature location sets can be tuned to different levels of sensitivity. A person skilled in the art realizes that there exist many possible averaging functions that can be used, and the Gaussian function is just one of these many possible averaging functions. The choice of the actual averaging functions depends on the particular application in which the present invention is implemented.

In (6) and (12), the distance between two feature location sets is determined, wherein the same averaging function is employed to derive the density function. However, it is not required that both density functions are generated by using the same averaging function. For example, a Gaussian averaging function can be used to generate the density function for one of the sets and a δ-function can be used for the other set. Moreover, the 2-norm was used in (6) to define the distance between two functions. Although in many cases, such as many HDSs, this will be a good choice, other distance measures can be chosen to perform the matching, for example $$d = n - \sum_{i=0}^{n} f_{Y,g}(x_i) =$$

$$n - f_{Y,g}(-x) * f_{X,\delta}(x)|_{x=0} = n - \int_{-\infty}^{\infty} F_{Y,g}(-\omega) F_{X,\delta}(\omega) d\omega$$

Note that in general, not every norm in the spatial domain carries over to the frequency domain or allows matching in the spatial frequency domain.

The idea of the present invention has been formulated for a set of feature locations in a biometric template. However, the hereinabove described distance measure can be used for any two sets of locations. These locations do not necessarily have to represent actual feature locations derived from biometric data. For example, in order to make feature location sets translation invariant, distance vectors between the respective features (i.e. components) may be processed. These distances vectors can also be seen as a set of locations. By applying the inventive distance measure on the derived set of locations, translation invariant matching may be achieved. The formulas that are given represent functionality and do not indicate how this functionality should be implemented. For example, although (1) is formulated as a convolution, it does not state that a convolution integral should be evaluated. Particularly in (1), the convolution can be done more efficient by summing a number of shifted averaging functions as can be seen in (3). Another possibility is to compute the convolution by first transforming both the averaging function s(x) and the sum of Dirac pulses to the frequency domain, then multiplying both the transformed functions and finally perform an inverse Fourier transform. Similarly, the expressions $F_{X,\delta}(\omega)$ and $F_{Y,\delta}(\omega)$ in (8) and (9), respectively, need not be calculated using a real Fourier transform on a summation of Dirac pulses. It is clear that $F_{X,\delta}(\omega)$ (and likewise $F_{Y,\delta}(\omega)$) can be more efficiently obtained as a summation of functions of the form $e^{-j\omega x_1}$.

Further features of, and advantages with, the present invention will become apparent when studying the appended claims and the following description. Those skilled in the art realize that different features of the present invention can be combined to create embodiments other than those described in the following.

A detailed description of preferred embodiments of the present invention will be given in the following with reference made to the accompanying drawings, in which:

FIG. 1 shows a prior art system for verification of an individual's identity (i.e. authentication/identification of the individual) using biometric data associated with the individual, in which system the present invention advantageously can be applied.

FIG. 1 shows a prior art system for verification of an individual's identity (i.e. authentication/identification of the individual) using biometric data associated with the individual, in which system the present invention advantageously may be employed. The system comprises a user device 101 arranged with a sensor 102 for deriving a first biometric template $X_T$ from a configuration of a specific physical feature 103 (in this case an iris) of the individual, or even from a combination of physical features. The user device employs a helper data scheme (HDS) in the verification, and enrolment data S and helper data W are derived from the first biometric template $X_T$, resulting in a feature location set X. The user device must be secure, tamper-proof and hence trusted by the individual, such that privacy of the individual's biometric data is provided. The helper data W is typically calculated at the user device 101 such that $S=G(X_F, W)$, where G is a delta-contracting function. Hence, W and S are calculated from a feature vector $X_F$ using a function or algorithm $F_G$ such that $(W, S)=F_G(X_F)$. The first feature vector $X_F$ is typically a vector with a predetermined number of entries.

An enrolment authority 104 initially enrolls the individual in the system by storing the enrolment data S and the helper data W received from the user device 101 in a central storage unit 105, which enrolment data subsequently is used by a verifier 106. The enrolment data S is secret to avoid identity-revealing attacks by analysis of S. At the time of verification, a second biometric template $Y_T$, which typically is a noise-contaminated copy of the first biometric template $X_T$, is offered by the individual 103 to the verifier 106 via a sensor 107. From the second biometric template $Y_T$, a second feature vector $Y_F$ is derived, which typically comprises the same number of entries as the feature vector $X_F$. The verifier 106 generates secret verification data S' based on the second feature vector $Y_F$ and the helper data W received from the central storage 105. The verifier 106 authenticates or identifies the individual by means of the enrolment data S fetched from the central storage 105 and the verification data S' created at a crypto block 108. Noise-robustness is provided by calculating verification data S' at the verifier as $S'=G(Y_F, W)$. The delta-contracting function has the characteristic that it allows the choice of an appropriate value of the helper data W such that S'=S, if the second biometric feature vector $Y_F$ sufficiently resembles the first biometric feature vector $X_F$. Hence, if a matching block 109 considers S' to be equal to S, verification is successful.

In a practical situation, the enrolment authority may coincide with the verifier, but they may also be distributed. As an example, if the biometric system is used for banking applications, all larger offices of the bank will be allowed to enroll new individuals into the system, such that a distributed enrolment authority is created. If, after enrolment, the individual wishes to withdraw money from such an office while using her biometric data as authentication, this office will assume the role of verifier. On the other hand, if the user makes a payment in a convenience store using her biometric data as authentication, the store will assume the role of the verifier, but it is highly unlikely that the store ever will act as enrolment authority. In this sense, we will use the enrolment authority and the verifier as non-limiting abstract roles.

As can be seen hereinabove, the individual has access to a device that contains a biometric sensor and has computing capabilities. In practice, the device could comprise a fingerprint sensor integrated in a smart card or a camera for iris or facial recognition in a mobile phone or a PDA. It is assumed that the individual has obtained the device from a trusted authority (e.g. a bank, a national authority, a government) and that she therefore trusts this device.

Now, when the present invention is applied in the system of FIG. 1, the first feature set X comprising n+1 components is derived from the first template $X_T$ and is transformed into a feature density function $f_{X,s}(x)$, as previously described in (1), by performing a summation of the different components, and convolving the resulting sum with an averaging function, whereby a new first feature vector $X_F=f_{X,s}(x)$ is created that advantageously can be used in an HDS. This will typically be a sampled version of the density function, which results in feature vectors of equal and finite dimensions regardless of the number n+1 of components present in the feature set X.

Thereafter, at the user device 101, the helper data W is typically calculated such that $S=G(f_{X,s}(x), W)$, where G is a delta-contracting function. Hence, W and S are calculated from the first feature vector $X_F=f_{X,s}(x)$ using a function or algorithm $F_G$ such that $(W, S)=F_G(X_F)$. As mentioned hereinabove, W and S are stored at the central storage 105 via the enrolment authority 104. At the time of verification, a second biometric template $Y_T$ is offered by the individual 103 to the verifier 106 via the sensor 107. The second feature location set Y derived from the second biometric template comprises m+1 components and is also transformed into a feature density function $f_{Y,s}(x)$, as previously described in (1), whereby a new second feature vector $Y_F=f_{Y,s}(x)$ is created. The verifier 106 generates secret verification data S' based on the second feature vector $Y_F = f_{Y,s}(x)$ and the helper data W received from the central storage 105. The verifier 106 authenticates or identifies the individual by means of the enrolment data S fetched from the central storage 105 and the verification data S' created at a crypto block 108. Noise-robustness is provided by calculating verification data S' at the verifier as $S'=G(f_{Y,s}(x), W)$.

As previously discussed, the delta-contracting property of G is useful if the feature vectors $X_F$ and $Y_F$ are sufficiently similar as a result of the biometric templates $X_T$ and $Y_T$ being sufficiently similar. This similarity between $X_F$ and $Y_F$ can be expressed as, for example, the Euclidian distance between $Y_F = f_{Y,s}(x)$ and $X_F = f_{X,s}(x)$ as given in (6) or (11). Thus, an inherent property of the delta-contracting function is that, if a matching block 109 considers S' to match S, i.e. if the Euclidian distance between $Y_F = f_{Y,s}(x)$ and $X_F = f_{X,s}(x)$ is small enough, the verification is successful.

The system for authentication/identification of the individual using biometric data associated with the individual as described above may alternatively be designed such that the user device 101 performs the operation of comparing S' to S, in which case it may be necessary for the verifier 106 or the enrolment authority 104 to provide the user device 101 with the centrally stored helper data W.

It is clear that the devices comprised in the system of the invention, i.e. the user device, the enrolment authority, the verifier and possibly also the central storage, is arranged with microprocessors or other similar electronic equipment having computing capabilities, for example programmable logic devices such as ASICs, FPGAs, CPLDs etc. Further, the microprocessors executes appropriate software stored in memories, on discs or on other suitable media for accomplishing tasks of the present invention.

Further, it is obvious to a skilled person that the data and the communications in the system described above can be further protected using standard cryptographic techniques such as SHA-1, MD5, AES, DES or RSA. Before any data is exchanged between devices (during enrolment as well as during verification) comprised in the system, a device might want some proof on the authenticity of another other device with which communication is established. For example, it is possible that the enrolment authority must be ensured that a trusted device did generate the enrolment data received. This can be achieved by using public key certificates or, depending on the actual setting, symmetric key techniques. Moreover, it is possible that the enrolment authority must be ensured that the user device can be trusted and that it has not been tampered with. Therefore, in many cases, the user device will contain mechanisms that allow the enrolment authority to detect tampering. For example, Physical Uncloneable Functions (PUFs) may be implemented in the system. A PUF is a function that is realized by a physical system, such that the function is easy to evaluate but the physical system is hard to characterize. Depending on the actual setting, communications between devices might have to be secret and authentic. Standard cryptographic techniques that can be used are Secure Authenticated Channels (SACs) based on public key techniques or similar symmetric techniques.

Also note that the enrolment data and the verification data may be cryptographically concealed by means of employing a one-way hash function, or any other appropriate cryptographic function that conceals the enrolment data and verification in a manner such that it is computationally infeasible to create a plain text copy of the enrolment/verification data from the cryptographically concealed copy of the enrolment/verification data. It is, for example possible to use a keyed one-way hash function, a trapdoor hash function, an asymmetric encryption function or even a symmetric encryption function.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of determining correspondence between location sets, comprising:
    transforming a first location set comprising a number of components into a density function by summing averaging functions shifted to locations indicated by selected components in the first location set; and
    determining a distance between the density function and another density function that corresponds to a second location set comprising a number of components, wherein correspondence exists between the first and the second location set if said distance complies with a predetermined distance value;
    wherein the summing of averaging functions shifted to locations indicated by selected components in the first location set is effected by performing a convolution of the averaging function with a sum of Dirac pulses at locations indicated by the selected components in the first location set.

2. The method according to claim 1, wherein the density function is sampled to create a feature vector having a fixed number of entries.

3. The method according to claim 1, wherein said location sets are feature location sets comprising feature components, which feature location sets are derived from biometric data associated with an individual.

4. The method according to claim 3, wherein the identity of the individual associated with the second feature location set is verified if said distance complies with a predetermined distance value.

5. The method according to claim 1, further comprising comparing the determined distance with a predetermined threshold value, wherein the first location set is considered to match the second location set if the value of said determined distance is less than said threshold value.

6. The method according to claim 1, wherein the determined distance between the density functions is the Euclidian distance.

7. The method according to claim 1, wherein the determination of said distance is performed in the spatial domain.

8. The method according to claim 1, wherein the determination of said distance is performed in the frequency domain.

9. The method according to claim 8, further comprising determining a Fourier transform of the first location set and the second location set, wherein a specific location in the first and second location sets is modeled as a Dirac pulse at said specific location.

10. The method according to claim 9, further comprising filtering, in the frequency domain, the respective transformed first and second location sets.

11. The method according to claim 10, wherein the filtered respective transformed first and second location sets are used as feature vectors in biometric authentication systems.

12. The method according to claim 1, wherein the density functions are sampled to create feature vectors having a fixed number of entries to be used in biometric authentication systems.

13. A computer program, embodied in a computer readable storage device for determining correspondence between location sets, comprising:

transforming a first location set comprising a number of components into a density function by summing averaging functions shifted to locations indicated by selected components in the first location set; and determining a distance between the density function and another density function that corresponds to a second location set comprising a number of components, wherein correspondence exists between the first and the second location set if said distance complies with a predetermined distance value;

wherein the summing of averaging functions shifted to locations indicated by selected components in the first location set is effected by the transforming means by performing a convolution of the averaging function with a sum of Dirac pulses at locations indicated by the selected components in the first location set.

14. A system for determining correspondence between location sets, the system comprising:

means for transforming a first location set comprising a number of components into a density function by summing averaging functions shifted to locations indicated by selected components in the first location set; and means for determining a distance between the density function and another density function that corresponds to a second location set comprising a number of components, wherein correspondence exists between the first and the second location set if said distance complies with a predetermined distance value;

wherein the summing of averaging functions shifted to locations indicated by selected components in the first location set is effected by the transforming means by performing a convolution of the averaging function with a sum of Dirac pulses at locations indicated by the selected components in the first location set.

15. The system according to claim 14, wherein the transforming means is arranged to sample the density function to create a feature vector having a fixed number of entries.

16. The system according to claim 14, wherein said location sets are feature location sets comprising feature components, which feature location sets are derived from biometric data associated with an individual.

17. The system according to claim 16, wherein the identity of the individual associated with the second feature location set is verified if said distance complies with a predetermined distance value.

18. The system according to claim 14, wherein the means for determining a distance is arranged to compare the determined distance with a predetermined threshold value, wherein the first location set is considered to match the second location set if the value of said determined distance is less than said threshold value.

19. The system according to claim 14, wherein the determined distance between the density functions is the Euclidian distance.

20. The system according to claim 14, wherein the determination of said distance is performed in the spatial domain.

21. The system according to claim 14, wherein the determination of said distance is performed in the frequency domain.

22. The system according to claim 21, wherein the transforming means and the determining means are further arranged to determine the Fourier transform of the first location set and the second location set, wherein a specific location in the first and second location sets is modeled as a Dirac pulse at said specific location.

23. The system according to claim 22, wherein the transforming means and the determining means are further arranged to filter, in the frequency domain, the respective transformed first and second location sets.

24. The system according to claim 23, wherein the respective transformed first and second location sets are used as feature vectors in biometric authentication systems.

25. The system according to claim 14, wherein the transforming means and the determining means are arranged to sample the density functions to create feature vectors having a fixed number of entries to be used in biometric authentication systems.

* * * * *